US009525294B2

(12) United States Patent
Hong et al.

(10) Patent No.: US 9,525,294 B2
(45) Date of Patent: *Dec. 20, 2016

(54) USB DEVICE FOR MAKING I/O PIN WITH INTACT VOLTAGE DURING CHARGING PROCEDURE AND RELATED METHOD

(71) Applicant: MEDIATEK INC., Hsin-Chu (TW)

(72) Inventors: Hao-Ping Hong, Hsinchu County (TW); Shang-Pin Chen, Hsinchu County (TW); Ding-Shiuan Shen, Chiayi County (TW)

(73) Assignee: MEDIATEK INC., Hsin-Chu (TW)

( * ) Notice: Subject to any disclaimer, the term of this patent is extended or adjusted under 35 U.S.C. 154(b) by 0 days.

This patent is subject to a terminal disclaimer.

(21) Appl. No.: 15/132,222

(22) Filed: Apr. 18, 2016

(65) Prior Publication Data

US 2016/0233710 A1 Aug. 11, 2016

Related U.S. Application Data

(63) Continuation of application No. 13/031,616, filed on Feb. 22, 2011, now Pat. No. 9,336,170.

(60) Provisional application No. 61/333,336, filed on May 11, 2010.

(51) Int. Cl.
*H02J 7/00* (2006.01)

(52) U.S. Cl.
CPC ............ *H02J 7/0052* (2013.01); *H02J 7/0045* (2013.01); *H02J 7/0068* (2013.01); *H02J 7/0081* (2013.01); *H02J 2007/0062* (2013.01)

(58) Field of Classification Search
USPC .................................. 320/103, 106
See application file for complete search history.

(56) References Cited

U.S. PATENT DOCUMENTS

| 6,324,339 | B1 | 11/2001 | Hudson | |
|---|---|---|---|---|
| 6,946,817 | B2 * | 9/2005 | Fischer | H02J 7/0027 320/107 |
| 7,581,119 | B2 | 8/2009 | Tupman | |
| 8,639,954 | B2 * | 1/2014 | Winkler | H02J 7/0068 713/300 |
| 2008/0042616 | A1 | 2/2008 | Monks | |

(Continued)

FOREIGN PATENT DOCUMENTS

| CN | 1906853 A | 1/2007 |
|---|---|---|
| TW | 200740005 | 10/2007 |
| WO | 2008001153 A1 | 1/2008 |

OTHER PUBLICATIONS

USB Implementers Forum, Inc., Battery Charging Specification, Apr. 15, 2009.

*Primary Examiner* — Drew A Dunn
*Assistant Examiner* — Steve T Chung
(74) *Attorney, Agent, or Firm* — Winston Hsu; Scott Margo

(57) ABSTRACT

A universal serial bus device includes: a core circuit having a first pin and a second pin, and having an input impedance looking into the core circuit from the first pin and the second pin; and a charging control circuit, coupled to the core circuit, arranged for selectively providing a voltage source to one of the first pin and the second pin; wherein the input impedance of the core circuit is configured to make the voltage source substantially intact when the voltage source is coupled to one of the first pin and the second pin.

13 Claims, 5 Drawing Sheets

(56) References Cited

U.S. PATENT DOCUMENTS

| | | | |
|---|---|---|---|
| 2010/0060233 A1* | 3/2010 | Kung | H02J 7/0052 320/107 |
| 2010/0064153 A1 | 3/2010 | Gk | |
| 2010/0090644 A1 | 4/2010 | Nokkonen | |
| 2010/0201308 A1* | 8/2010 | Lindholm | G06F 1/26 320/107 |
| 2010/0219790 A1 | 9/2010 | Chadbourne | |
| 2010/0277145 A1 | 11/2010 | Krishna | |

* cited by examiner

USB DEVICE FOR MAKING I/O PIN WITH INTACT VOLTAGE DURING CHARGING PROCEDURE AND RELATED METHOD

CROSS REFERENCE TO RELATED APPLICATION

This is a continuation of the co-pending U.S. application Ser. No. 13/031,616 (filed on Feb. 22, 2011), which claims the benefit of U.S. provisional application No. 61/333,336 (filed on May 11, 2010). The entire content of the related applications is incorporated herein by reference.

BACKGROUND

The present invention relates to a universal serial bus (USB) device and related method, and more particularly to a charging control circuit of the USB device and related method.

A portable device with a universal serial bus (USB) port, e.g., USB 2.0 port, is capable of charging a battery in the portable device via the USB 2.0 port when the battery of the portable device is under a dead battery or a weak battery condition. When the portable device with the dead battery or the weak battery condition is connected to a downstream port, the portable device is allowed to draw an external current from the downstream port to charge the battery. The portable device is also required to assert a predetermined voltage at a first I/O (Input/output) pin of the USB 2.0 port within a first predetermined time after the external current is higher than a predetermined magnitude of current. Then, the predetermined voltage remains asserted after the external current drawn from the downstream port is higher than the predetermined magnitude of current. When the portable device is ready to be connected, the predetermined voltage at the first I/O pin of the USB 2.0 port should be disabled, and a predetermined current should be enabled on a second I/O (Input/output) pin of the USB 2.0 port, lasting for a predetermined time interval in order to check if the data pins (i.e., the first and second I/O pins) have made contact with the host. In other words, during the procedure of charging the battery in the portable device via the USB 2.0 port, a predetermined voltage should be asserted at the first I/O pin of the USB 2.0 port for a first predetermined time interval, and a predetermined current should be asserted at the second I/O pin of the USB 2.0 port for a second predetermined time interval. However, due to the fact that the core circuit and the related system of the portable device may not be ready when the battery of the portable device is under the dead battery or the weak battery condition, the voltage at the first I/O pin of the USB 2.0 port is hard to maintain at the predetermined voltage during the charging procedure. Similarly, the current at the second I/O pin of the USB 2.0 port is also hard to maintain at the predetermined current during the charging procedure. Providing an efficient and low cost mechanism to provide a predetermined voltage and a predetermined current at the data pins of the USB 2.0 port during the charging procedure is a significant concern in the field of USB portable devices.

SUMMARY

One of the objectives is therefore to provide a charging control circuit of a USB device and related method to solve the above-mentioned problems.

According to an exemplary embodiment of the present invention, a universal serial bus device is disclosed. The universal serial bus device comprises a core circuit and a charging control circuit. The core circuit has a first pin and a second pin, and the core circuit further has an input impedance looking into the core circuit from the first pin and the second pin. The charging control circuit is coupled to the core circuit, and is arranged for selectively providing a voltage source to one of the first pin and the second pin, wherein the input impedance of the core circuit is configured to make the voltage source substantially intact when the voltage source is coupled to one of the first pin and the second pin.

According to a second exemplary embodiment of the present invention, a bus interfacing device is disclosed. The bus interfacing device comprises a start-up circuit, a first control circuit, a converting circuit, a second control circuit, a physical layer circuit, and a charging control circuit. The start-up circuit is arranged for generating a start-up ready signal. The first control circuit is arranged for receiving a battery output voltage and generating a first control signal according to the start-up ready signal. The converting circuit is arranged for receiving the battery output voltage to provide a core voltage according to the first control signal. The second control circuit is arranged for receiving the core voltage and generating a second control signal according to the start-up ready signal. The physical layer circuit has a first pin and a second pin, and the physical layer circuit is arranged for being configured by the second control signal and powered by the core voltage, and the physical layer circuit has an input impedance looking into the physical layer circuit from the first pin and the second pin. The charging control circuit comprises a charger detector and a switching circuit. The charger detector is arranged for generating a predetermined voltage. The switching circuit is arranged for selectively coupling the predetermined voltage to one of the first pin and the second pin, wherein the input impedance of the physical layer circuit is configured to make the predetermined voltage substantially intact when the predetermined voltage is coupled to one of the first pin and the second pin.

According to a third exemplary embodiment of the present invention, a bus interfacing device is disclosed. The bus interfacing device comprises a start-up circuit, a converting circuit, a core circuit, and a charging control circuit. The start-up circuit is arranged for generating a start-up ready signal. The converting circuit is arranged for receiving a battery output voltage to provide a core voltage. The core circuit has a first pin and a second pin, and the core circuit is arranged for being configured according to the start-up ready signal and powered by the core voltage, and the core circuit having an input impedance looking into the core circuit from the first pin and the second pin. The charging control circuit comprises a charger detector and a switching circuit. The charger detector is arranged for generating a predetermined voltage. The switching circuit is arranged for selectively coupling the predetermined voltage to one of the first pin and the second pin, wherein the input impedance of the core circuit is configured to make the predetermined voltage substantially intact when the predetermined voltage is coupled to one of the first pin and the second pin.

According to a fourth exemplary embodiment of the present invention, a method for bus interfacing is disclosed. The method comprises: providing a core circuit having a first pin and a second pin; selectively providing a voltage source having a predetermined voltage to one of the first pin and the second pin; and arranging an input impedance looking into the core circuit from the first pin and the second pin to make the predetermined voltage substantially intact when the voltage source is coupled to one of the first pin and the second pin.

These and other objectives of the present invention will no doubt become obvious to those of ordinary skill in the art after reading the following detailed description of the preferred embodiment that is illustrated in the various figures and drawings.

DETAILED DESCRIPTION

Certain terms are used throughout the description and following claims to refer to particular components. As one skilled in the art will appreciate, electronic equipment manufacturers may refer to a component by different names. This document does not intend to distinguish between components that differ in name but not function. In the following description and in the claims, the terms "include" and "comprise" are used in an open-ended fashion, and thus should be interpreted to mean "include, but not limited to . . . ". Also, the term "couple" is intended to mean either an indirect or direct electrical connection. Accordingly, if one device is coupled to another device, that connection may be through a direct electrical connection, or through an indirect electrical connection via other devices and connections.

Figure 1:
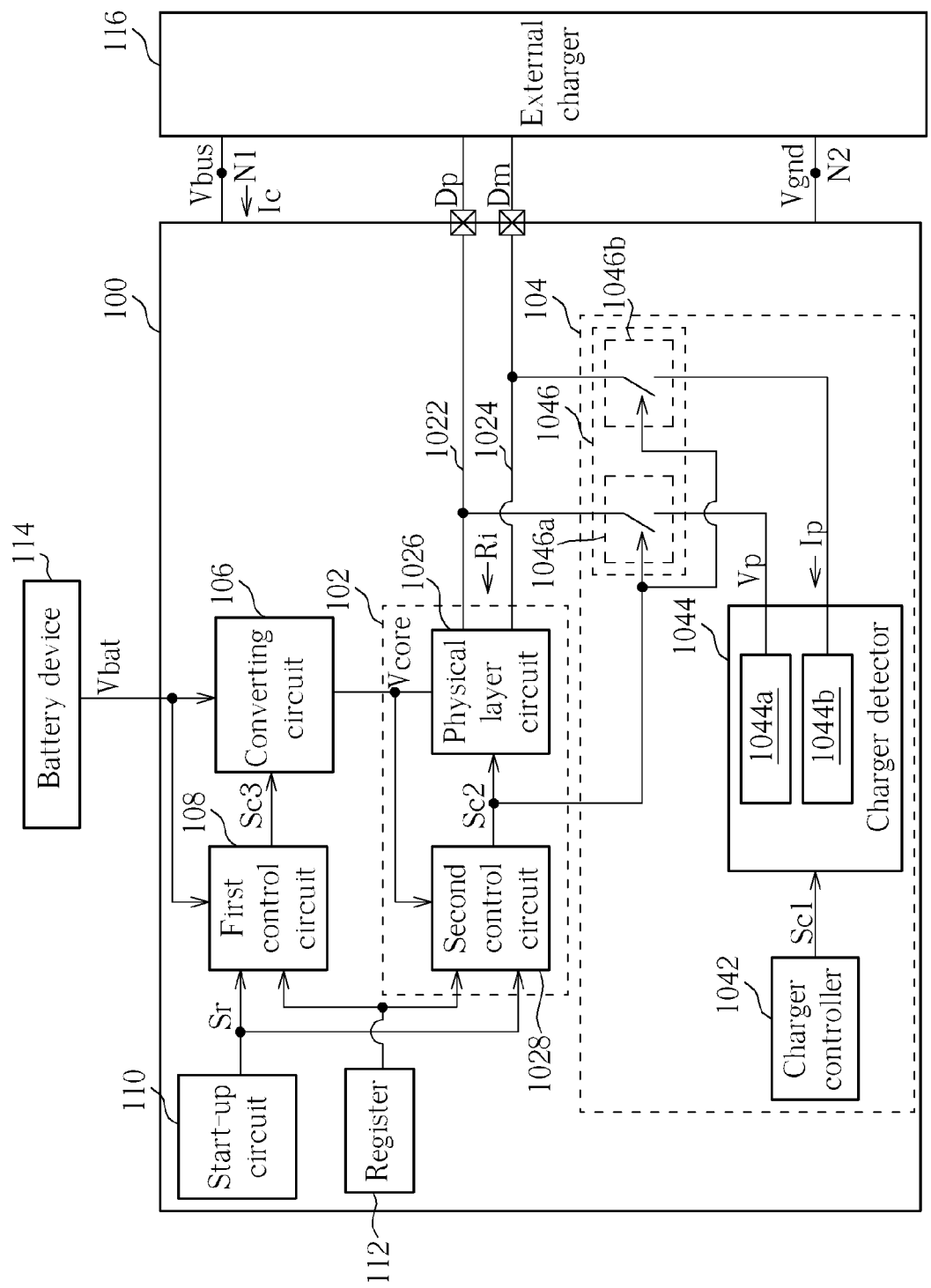
FIG. 1 is a diagram illustrating a bus interfacing device according to an exemplary embodiment of the present invention.

Please refer to FIG. 1. FIG. 1 is a diagram illustrating a bus interfacing device, such as a universal serial bus (USB) device 100, according to an exemplary embodiment of the present invention. The USB device 100 may be a portable device with a USB 2.0 port. However, the present invention is not so limited. The USB device 100 may have a USB port compatible with the USB 2.0 specification or the battery charging 1.1 specification. The USB device 100 comprises a core circuit 102 and a charging control circuit 104. The core circuit 102 has a first pin Dp and a second pin Dm. The core circuit 102 is designed to have an input impedance Ri looking into the core circuit 102 from the first pin Dp and the second pin Dm. The charging control circuit 104 is coupled to the core circuit 102, and is arranged for selectively providing a voltage source having a predetermined voltage Vp to one of the first pin Dp and the second pin Dm, and selectively providing a current source having a predetermined current Ip to one of the first pin Dp and the second pin Dm. Furthermore, the input impedance Ri of the core circuit 102 makes the predetermined voltage Vp substantially intact when the voltage source is coupled to one of the first pin Dp and the second pin Dm, and makes the predetermined current Ip substantially intact when the current source is coupled to one of the first pin and the second pin. It should be noted that, in this application embodiment, the voltage source of the charging control circuit 104 is arranged to provide the predetermined voltage Vp to the first pin Dp, and the current source of the charging control circuit 104 is arranged to provide the predetermined current Ip to the second pin Dm. This implementation is for brevity of description, however, and is not the limitation of the present invention. In addition, the first pin Dp and the second pin Dm are arranged to be permanently coupled to the core circuit 102. For this exemplary embodiment, a first conducting path 1022 is arranged to permanently connect between the core circuit 102 and the first pin Dp, and a second conducting path 1024 is arranged to permanently connect between the core circuit 102 and the second pin Dm. In other words, no switching device is necessary on the conducting paths connected between the core circuit 102 and the first and second pins Dp, Dm. It should be noted that the first and the second pins Dp, Dm are the ports of the USB device 100 arranged to receive signal from the circuit external to the USB device 100 or to output signal to the circuit external to the USB device 100.

The charging control circuit 104 comprises a charger controller 1042, a charger detector 1044, and a switch circuit 1046. The charger controller 1042 is arranged for generating a control signal Sc1. The charger detector 1044 includes the voltage source 1044a generating the predetermined voltage Vp and the current source 1044b generating the predetermined current Ip according to the control signal Sc1. The switch circuit 1046 is coupled to the first pin Dp and the second pin Dm in parallel, and the switch circuit 1046 is arranged for selectively coupling the voltage source 1044a to one of the first pin Dp and the second pin Dm, and selectively coupling the current source to one of the first pin Dp and the second pin Dm according to a switch control signal Sc2. Similarly, in this exemplary embodiment, the switch circuit 1046 is arranged for selectively coupling the voltage source 1044a to the first pin Dp, and selectively coupling the current source 1044b to the second pin Dm according to the switch control signal Sc2. This is also for the purposes of brevity of description. In another embodiment, the current source 1044b can be replaced by a resistor, and there might be current or no current flowing through the resistor depending on the port type.

Furthermore, in this application embodiment, the USB device 100 further comprises a converting circuit 106, a first control circuit 108, a start-up circuit 110, a register 112, and a battery device 114. The core circuit 102 further comprises a physical layer circuit 1026 and a second control circuit 1028. The converting circuit 106 is arranged to convert a battery output voltage Vbat into a core voltage Vcore lower or higher than the battery output voltage Vbat. In this preferred embodiment, the converting circuit 106 includes a low dropout circuit, where the low dropout circuit receives the battery output voltage Vbat generated by the battery device 114 to provide the core voltage Vcore for supplying the physical layer circuit 1026 and the second control circuit 1028 according to a control signal Sc3. The first control circuit 108 and the second control circuit 1028 are arranged to generate the control signals Sc3, Sc2 according to signals outputted from the start-up circuit 110 and the register 112. In this preferred embodiments, the first control circuit 108 and the second control circuit 1028 include a first level shifter and a second level shifter respectively, wherein the first level shifter performs a level shifting upon a start-up ready signal Sr and signals outputted from the register 112 to generate the control signal Sc3 for the converting circuit 106, and the second level shifter performs the level shifting upon the start-up ready signal Sr and signals outputted from the register 112 to generate the control signal Sc2 for the physical layer circuit 1026 and the charging control circuit 104. The start-up circuit 110 generates the start-up ready signal Sr to the first control circuit 108 and the second control circuit 1028. The physical layer circuit 1026 is configured by the control signal Sc2. More specifically, the physical layer circuit 1026 is the main circuit of the USB device 100 operable for processing the data inputted from the first pin Dp and the second pin Dm, or generating the output data to the first pin Dp and the second pin Dm. For example, the physical layer circuit 1026 can be a memory controller in one preferred embodiment of the present invention. Furthermore, the register 112 stores a predetermined configuration data utilized for configuring the first control circuit 108 and the second control circuit 1028 when the first control circuit 108 and the second control circuit 1028 are started-up by the start-up ready signal Sr.

In this exemplary embodiment, the switch circuit 1046 comprises a first switch 1046a and a second switch 1046b. The first switch 1046a has a first terminal coupled to the first pin Dp, a second terminal coupled to the voltage source 1044a providing the predetermined voltage Vp, and a control terminal coupled to the control signal Sc2. The second switch 1046b has a first terminal coupled to the second pin Dm, a second terminal coupled to the current source 1044b providing the predetermined current Ip, and a control terminal coupled to the control signal Sc2.

When the USB device 100 is under a dead battery condition, i.e., when the charge level of the battery device 114 reaches a predetermined threshold which assures the USB device 100 is not able to power up successfully, the USB device 100 can be coupled to an external charger 116 (such as a USB host device or a standard/nonstandard charger having USB port) for charging the battery device 114, wherein the external charger 116 has four pins coupled to the USB device 100, in which the first pin N1 generates a first supply voltage Vbus to the USB device 100, the second and third pins are coupled to the first pin Dp and the second pin Dm of the USB device 100, and the fourth pin N2 generates a ground voltage Vgnd to the USB device 100 as shown in FIG. 1. More specifically, in this exemplary embodiment, the first supply voltage Vbus of the external charger 116 first charges the battery device 114 until the battery output voltage Vbat of the battery device 114 is high enough to power up the converting circuit 106 and the first control circuit 108. When the battery output voltage Vbat of the battery device 114 is high enough to power up the first control circuit 108, the converting circuit 106, and the charging control circuit 104, the first control circuit 108 generates the control signal Sc3 (e.g., the default value of the control signal Sc3) to enable the converting circuit 106 when the first control circuit 108 is powered up, and the charger controller 1042 generates the control signal Sc1 when the charger controller 1042 is powered up. Then, the converting circuit 106 provides the core voltage Vcore to power up the physical layer circuit 1026 and the second control circuit 1028. When the core voltage Vcore is high enough to power up the physical layer circuit 1026 and the second control circuit 1028, the second control circuit 1028 generates the switch control signal Sc2 (e.g., the default value of the switch control signal Sc2) to configure the physical layer circuit 1026 such that the input impedance Ri of the core circuit 102 makes the predetermined voltage Vp substantially intact when the voltage source is coupled to the first pin Dp and makes the predetermined current Ip substantially intact when the current source is coupled to the second pin Dm, thereby turning on the switch circuit 1046 (i.e., the first switch 1046a and the second switch 1046b) when the second control circuit 1028 is powered up. In other words, in this exemplary embodiment, the charging control circuit 104 is arranged to provide the predetermined voltage Vp to the first pin Dp and provide the predetermined current Ip to the second pin Dm after the core circuit 102 is powered up, and the input impedance Ri of the core circuit 102 is configured to make the predetermined voltage Vp substantially intact and makes the predetermined current Ip substantially intact. It should also be noted that, before the core circuit 102 is powered up, the switch control signal Sc2 is arranged to turn off the switch circuit 1046 (the first switch 1046a and the second switch 1046b).

Figure 2:
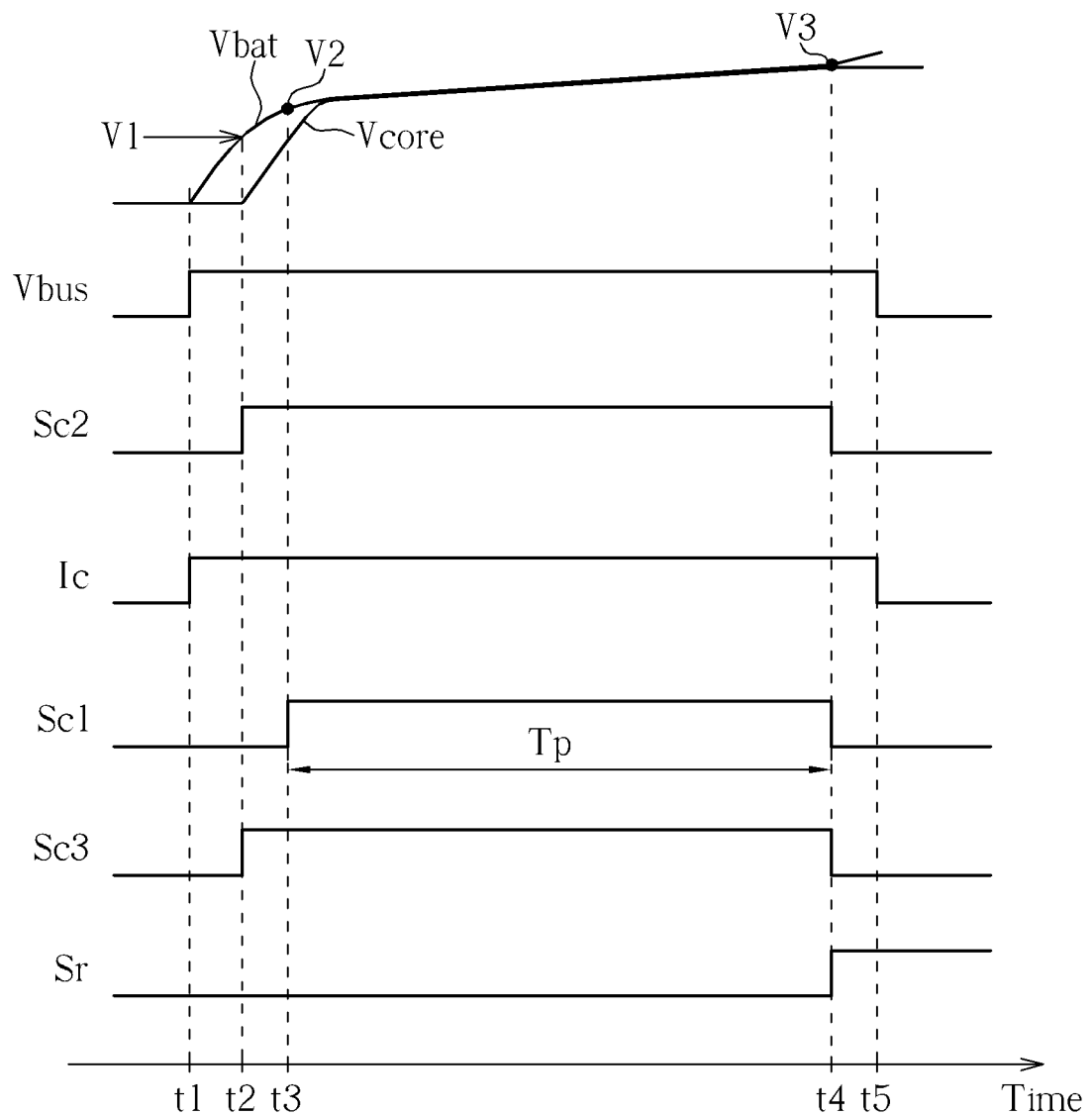
FIG. 2 is a timing diagram illustrating a first supply voltage, a battery output voltage, a core voltage, a charging current, control signals, and a start-up ready signal in FIG. 1 according to an exemplary embodiment of the present invention.

Please refer to FIG. 2. FIG. 2 is a timing diagram illustrating the first supply voltage Vbus, the battery output voltage Vbat, the core voltage Vcore, a charging current Ic, the control signal Sc1, the switch control signal Sc2, the control signal Sc3, and the start-up ready signal Sr in FIG. 1 according to an exemplary embodiment of the present invention. When the external charger 116 is coupled to the USB device 100 which is under the dead battery condition at time t1, the voltage of the first supply voltage Vbus at the pin N1 is transited to the high voltage level, and the external charger 116 provides the charging current Ic to charge the battery device 114 via the first pin N1. When the output of the battery device 114, i.e., the battery output voltage Vbat, reaches the first voltage V1 at time t2, the voltage of the control signal Sc3 is transited to the high voltage level from the low voltage level to enable the converting circuit 106, and the voltage of the switch control signal Sc2 is transited to the high voltage level from the low voltage level (or transited to the low voltage level from the high voltage level) to configure the physical layer circuit 1026 and turn on the switch circuit 1046. Then, when the output of the battery device 114, i.e., the battery output voltage Vbat, reaches the second voltage V2 at time t3, the charger controller 1042 transits the voltage of the control signal Sc1 to the high voltage level from the low voltage level to turn on the charger detector 1044.

After the time t3, the charger detector 1044 will keep turning on for a time interval Tp in order to make the external charger 116 charge the battery device 114. In the time interval Tp, the voltage levels of the battery output voltage Vbat and the core voltage Vcore keep increasing until they reach the predetermined voltage level V3 at time t4. Then, at the time t4, the start-up circuit 110 is started-up and generates the start-up ready signal Sr to the first control circuit 108 and the second control circuit 1028. That is, the start-up circuit 110 is capable of detecting the dead battery condition, while the start-up ready signal Sr is an indication of the dead battery situation (before time t4, the USB device is under the dead battery condition). Accordingly, the first control circuit 108 transits the control signal Sc3 to the low voltage level from the high voltage level to disable the converting circuit 106, and the second control circuit 1028 transits the switch control signal Sc2 to the low voltage level from the high voltage level to configure the physical layer circuit 1026 and to turn off the switch circuit 1046 (the first switch 1046a and the second switch 1046b) at the time t4. In addition, the charger controller 1042 also transits the control signal Sc1 to the low voltage level from the high voltage level to turn off the charger detector 1044 at the time t4. Then, at time t5, the voltage of the first supply voltage Vbus at the pin N1 is transited to the low voltage level, and the external charger 116 stops providing the charging current Ic to charge the battery device 114 via the first pin N1. After the time t5, the charging process of the USB device 100 is finished.

It should be noted that, in the time interval from the time t2 to t4, the second control circuit 1028 generates the switch control signal Sc2 to configure the physical layer circuit 1026 to make the input impedance Ri looking into the core circuit 102 be a high input impedance. For example, the resistance value of the input impedance Ri may not be less than 300 k Ohm (kilo Ohm). By setting the input impedance Ri as a high input impedance, the predetermined voltage Vp generated by the voltage source 1044a can be kept substantially intact when the voltage source 1044a is coupled to the first pin Dp, and the predetermined current Ip can also be kept substantially intact when the current source 1044b is coupled to the second pin Dm. Therefore, the present charging control circuit 104 and the related charging process may comply with the standard of the BC (Battery Charging) 1.1 specifications.

Furthermore, in this embodiment, the USB device 100 is a single chip device. In other words, the charging control circuit 104 is an internal device in the USB device 100, and the switch circuit 1046 can also be used by other functional blocks in the USB device 100 during a time when the USB device 100 is not in the charging process.

In another embodiment, the first control circuit 108 can be omitted. The converting circuit 106 is coupled to the battery device 114 and the core circuit 102. When the battery device 114 is coupled, the converting circuit 106 enables and converts the battery output voltage Vbat to the core voltage Vcore without the control of control signal Sc3. This modification still falls within the scope of the present invention.

Figure 3:
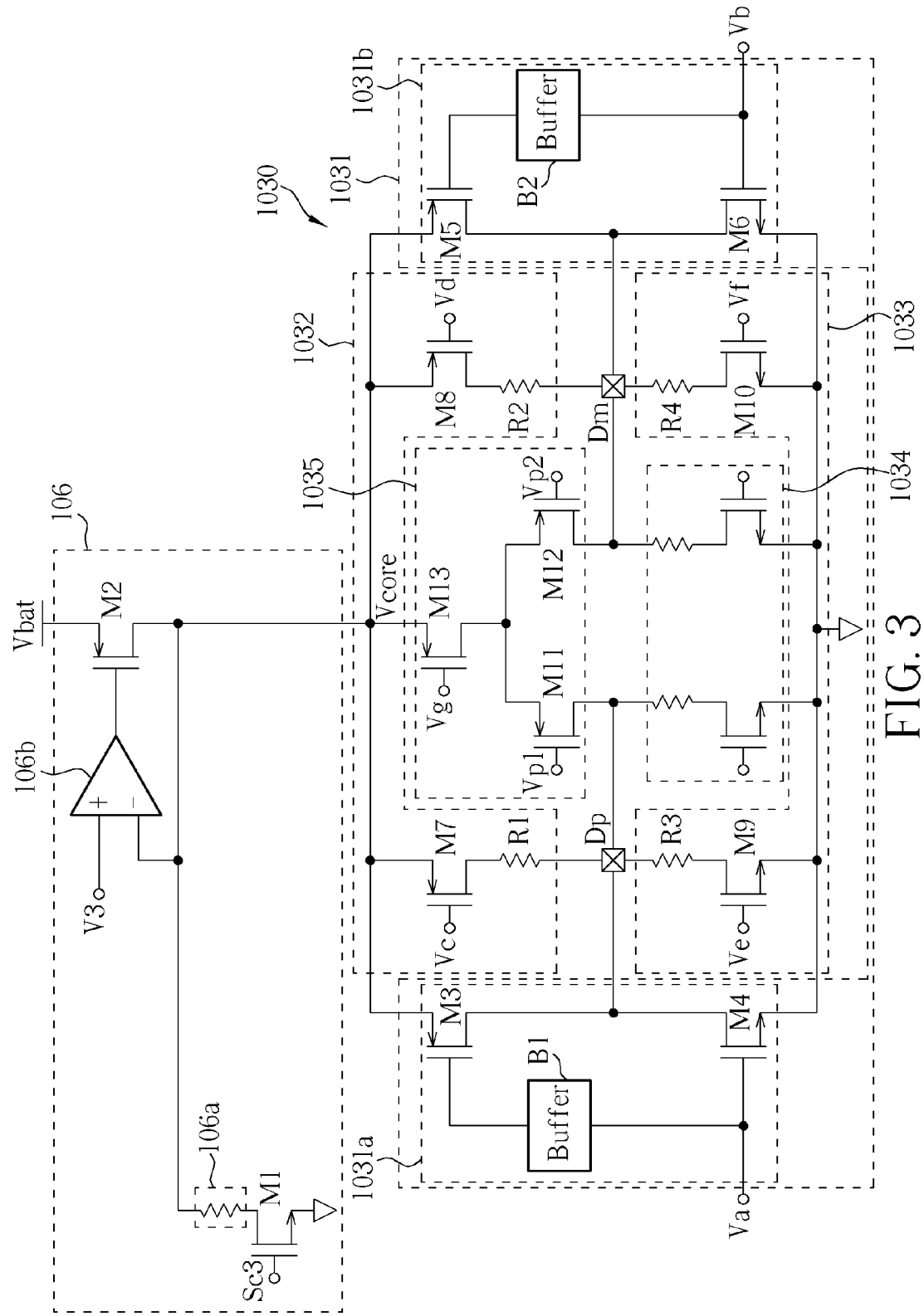
FIG. 3 is a diagram illustrating an output stage of a physical layer circuit in conjunction with a low dropout circuit of FIG. 1 according to an exemplary embodiment of the present invention.

Please refer to FIG. 3. FIG. 3 is a diagram illustrating an output stage 1030 of the physical layer circuit 1026 in conjunction with the converting circuit 106 of FIG. 1 according to an exemplary embodiment of the present invention. The converting circuit 106 comprises a first N-type transistor Ml, a second N-type transistor M2, a first resistor 106a, and an operational amplifier 106b, wherein the gate terminal of the first N-type transistor M1 coupled to the control signal Sc3, the operational amplifier 106b and the second N-type transistor M2 are configured as a closed loop circuit to generate the core voltage Vcore according to the battery output voltage Vbat and the predetermined voltage level V3. The output stage 1030 of the physical layer circuit 1026 comprises a protection circuit 1031, a pull high circuit 1032, a pull low circuit 1033, a loading circuit 1034, and a driving circuit 1035. The protection circuit 1031 comprises two protection units 1031a, 1031b coupled to the first pin Dp and the second pin Dm respectively. The first protection unit 1031a comprises a P-type transistor M3, an N-type transistor M4, and a buffer B1, wherein the gate terminal of the N-type transistor M4 and the input terminal of the buffer B1 are connected to a predetermined voltage Va, and the drain terminals of the P-type transistor M3 and the N-type transistor M4 are connected to the first pin Dp. The second protection unit 1031b comprises a P-type transistor M5, an N-type transistor M6, and a buffer B2, wherein the gate terminal of the N-type transistor M6 and the input terminal of the buffer B2 are connected to a predetermined voltage Vb, and the drain terminals of the P-type transistor M5 and the N-type transistor M6 are connected to the second pin Dm.

The pull high circuit 1032 comprises P-type transistors M7, M8, and resistors R1, R2, wherein the P-type transistors M7 and the resistor R1 are connected in series between the first pin Dp and the core voltage Vcore, and the P-type transistors M8 and the resistor R2 are connected in series between the second pin Dm and the core voltage Vcore. The pull down circuit 1033 comprises N-type transistors M9, M10, and resistors R3, R4, wherein the N-type transistor M9 and the resistor R3 are connected in series between the first pin Dp and the ground voltage Vgnd, and the N-type transistor M10 and the resistor R4 are connected in series between the second pin Dm and the ground voltage Vgnd. In addition, the gate terminal of the P-type transistor M7 is connected to a predetermined voltage Vc to selectively pull high the first pin Dp, the gate terminal of the P-type transistor M8 is connected to a predetermined voltage Vd to selectively pull high the second pin Dm, the gate terminal of the N-type transistor M9 is connected to a predetermined voltage Ve to selectively pull low the first pin Dp, and the gate terminal of the N-type transistor M10 is connected to a predetermined voltage Ve to selectively pull low the second pin Dm. The driving circuit 1035 comprises P-type transistors M11, M12, M13, wherein the gate terminals of the P-type transistors M11, M12 are connected to the first pre-drive signal Vp1 and the second pre-drive signal Vp2 respectively, and the drain terminals of the P-type transistors M11, M12 are connected to the first pin Dp and the second pin Dm respectively. In addition, the P-type transistor M13 controls the current of the driving circuit 1035 according to a control voltage Vg.

According to this exemplary embodiment, the gate terminals of the P-type transistors M11, M12 are tied to the high voltage level to turn off the P-type transistors M11, M12 at the time t2 according to the switch control signal Sc2 as shown in FIG. 2. Therefore, the input impedance Ri looking into the first pin Dp and the second pin Dm is a high input impedance. To make sure the input impedance Ri looking into the first pin Dp and the second pin Dm is a high input impedance in the time interval from the time t2 to t4, the P-type transistors M3, M5, M7, M8, and the N-type transistors M4, M6, M9, M10 are controlled to turn off in the time interval from the time t2 to t4 according to the switch control signal Sc2, which also belongs to the scope of the present invention. When all of the transistors connected to the first pin Dp and the second pin Dm are turned off, meaning that the first pin Dp and the second pin Dm have floating voltages and the input impedance Ri of the core circuit 102 resists a current to flow into the core circuit 102, no current will flow into the core circuit 102 via the first pin Dp and the second pin Dm when the predetermined voltage Vp is coupled to the first pin Dp and the predetermined current Ip is coupled to the second pin Dm.

Figure 4:
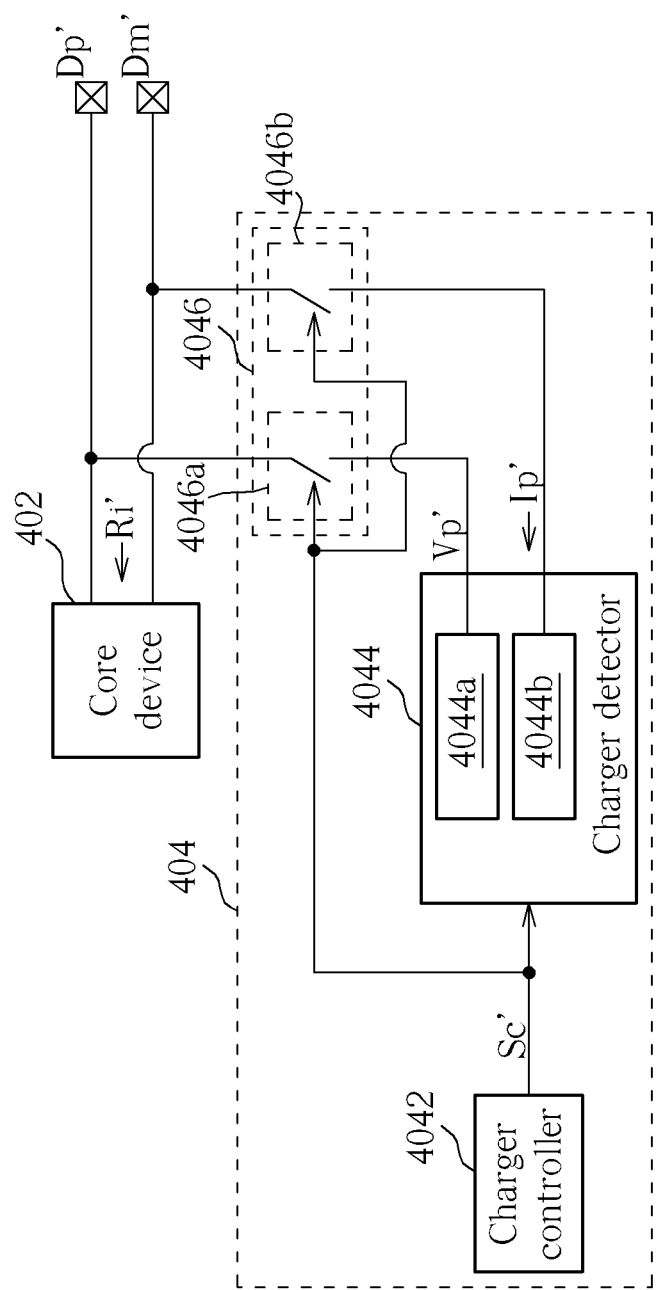
FIG. 4 is a diagram illustrating a core device and a charging control circuit according to an exemplary embodiment of the present invention.

Please note that, even though the output stage 1030 shown in FIG. 3 is arranged to provide the high input impedance looking into the first pin Dp and the second pin Dm in the time interval from the time t2 to t4 after the core circuit 102 is powered on, this is not a necessary condition of the present invention. In another exemplary embodiment, the core circuit 102 can also be powered off but still provide the high input impedance looking into the first pin Dp and the second pin Dm in the time interval from the time t2 to t4. Please refer to FIG. 4. FIG. 4 is a diagram illustrating a core device 402 and a charging control circuit 404 according to an exemplary embodiment of the present invention. In this exemplary embodiment, the charging control circuit 404 comprises a charger controller 4042, a charger detector 4044, and a switch circuit 4046. The charger controller 4042 is arranged for generating a control signal Sc'. The charger detector 4044 includes the voltage source 4044a generating the predetermined voltage Vp' and the current source 4044b generating the predetermined current Ip' according to the control signal Sc'. The switch circuit 4046 is coupled to the first pin Dp' and the second pin Dm' in parallel, and the switch circuit 4046 is arranged for selectively coupling the voltage source 4044a to one of the first pin Dp' and the second pin Dm', and selectively coupling the current source 4044b to one of the first pin Dp' and the second pin Dm' according to the control signal Sc'. For brevity, the switch circuit 4046 is arranged for selectively coupling the voltage source 4044a to the first pin Dp', and selectively coupling the current source 4044b to the second pin Dm' according to the control signal Sc' in this exemplary embodiment.

Furthermore, when the core circuit 402 is not powered up, the core circuit 402 is designed to have an input impedance Ri' looking into the core circuit 402 from the first pin Dp' and the second pin Dm', wherein the input impedance Ri' is a high input impedance such that the predetermined voltage Vp' generated by the voltage source 4044a can be kept substantially intact when the voltage source 4044a is coupled to the first pin Dp', and the predetermined current Ip' can also be kept substantially intact when the current source 4044b is coupled to the second pin Dm'.

The switch circuit 4046 comprises a first switch 4046a and a second switch 4046b. The first switch 4046a has a first terminal coupled to the first pin Dp', a second terminal coupled to the voltage source 4044a providing the predetermined voltage Vp', and a control terminal coupled to the control signal Sc'. The second switch 4046b has a first terminal coupled to the second pin Dm', a second terminal coupled to the current source 4044b providing the predetermined current Ip', and a control terminal coupled to the control signal Sc'.

In this exemplary embodiment, when the core circuit 402 and the charging control circuit 404 are coupled to an external charger, the charging control circuit 404 is arranged to be turned on according to the supply voltage provided by the external charger. When the charging control circuit 404 is turned on, the charger controller 4042 generates the control signal Sc' to turn on the first switch 4046a and the second switch 4046b. Similar to the exemplary embodiment as shown in FIG. 1, when the input impedance Ri' is high enough to keep the predetermined voltage Vp'substantially intact when the voltage source 4044a is coupled to the first pin Dp', and keep the predetermined current Ip'substantially intact when the current source 4044b is coupled to the second pin Dm', the external charger is capable of proceeding the charging process to charge the battery device of the core circuit 402.

Figure 5:
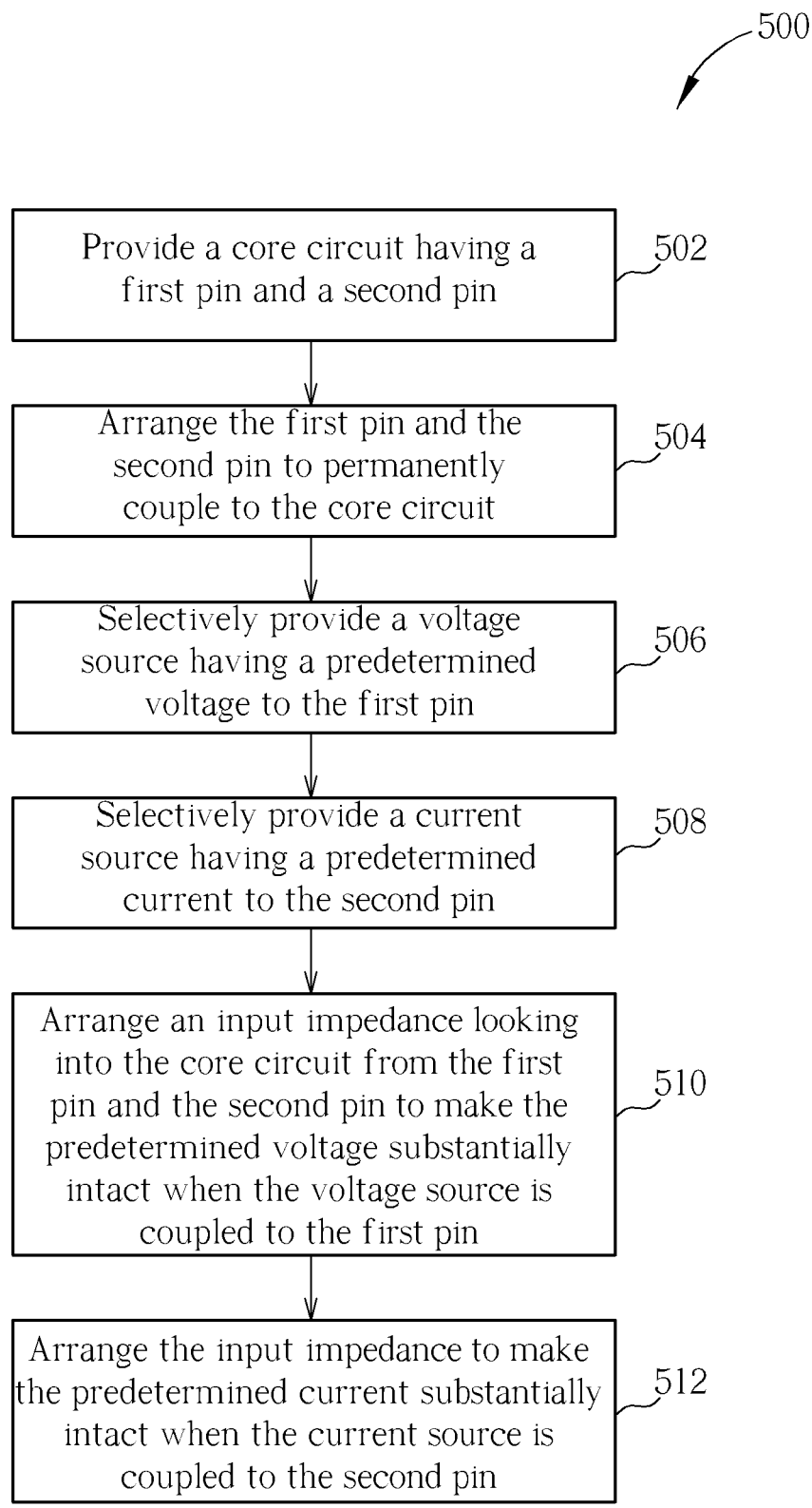
FIG. 5 is a flowchart illustrating a method for bus interfacing according to an embodiment of the present invention.

Please refer to FIG. 5. FIG. 5 is a flowchart illustrating a method 500 for bus interfacing according to an embodiment of the present invention. The method 500 is aimed at making the above-mentioned predetermined voltage Vp substantially intact when the voltage source is coupled to one of the first pin Dp and the second pin Dm, and making the predetermined current Ip substantially intact when the current source is coupled to one of the first pin and the second pin. Therefore, the above-mentioned embodiments of USB devices may be regarded as employing the method 500 to obtain the similar results. For simplicity, the detailed description of the method 500 is described in conjunction with the USB device 100. Furthermore, provided that substantially the same result is achieved, the steps of the flowchart shown in FIG. 5 need not be in the exact order shown and need not be contiguous; that is, other steps can be intermediate. The method 500 comprises:

Step 502: Provide the core circuit 102 having the first pin Dp and the second pin Dm;

Step 504: Arrange the first pin Dp and the second pin Dm to permanently couple to the core circuit 102;

Step 506: Selectively provide the voltage source 1044a having the predetermined voltage Vp to the first pin Dp;

Step 508: Selectively provide the current source 1044b having the predetermined current Ip to the second pin Dm;

Step 510: Arrange the input impedance Ri looking into the core circuit 102 from the first pin Dp and the second pin Dm to make the predetermined voltage Vp substantially intact when the voltage source 1044a is coupled to the first pin Dp; and Step 512: Arrange the input impedance Ri to make the predetermined current Ip substantially intact when the current source 1044b is coupled to the second pin Dm.

Please refer to FIG. 1, FIG. 2, and FIG. 5. When the external charger 116 is coupled to the USB device 100 via the pins N1, Dp, Dm, and N2, the external charger 116 is responsible to charge the battery device 114 of the USB device 100. As mentioned above, in the time interval from the time t2 to t4, the second control circuit 1028 generates the switch control signal Sc2 to configure the physical layer circuit 1026 to make the input impedance Ri looking into the core circuit 102 be the high input impedance, then the predetermined voltage Vp can be kept substantially intact when the voltage source 1044a is coupled to the first pin Dp, and the predetermined current Ip can be kept substantially intact when the current source 1044b is coupled to the second pin Dm. Therefore, by using the present method 502-512, and the charging process of the USB device 100 may comply with the standard of the BC (Battery Charging) 1.1 specifications even if the USB device is under the weak/dead battery condition.

Briefly, the present invention merges the charging control circuit (e.g., 104, 404) into the USB device (e.g., 100) to perform the charger detection, in which the switch device (e.g., 1046, 4046) does not exist on the conducting paths connected between the core circuit (e.g., 102, 402) and the first and second pins (e.g., Dp, Dm), while the input impedance (e.g., Ri, Ri') is high enough to keep the predetermined voltage (e.g., Vp, Vp') substantially intact when the voltage source (e.g., 1044a, 4044a) is coupled to the first pin, and keep the predetermined current (e.g., Ip, Ip') substantially intact when the current source (e.g., 1044b, 4044b) is coupled to the second pin. Accordingly, the present invention not only has the advantages of reducing the size of the USB device but also complies with the standard of the BC (Battery Charging) 1.1 specifications.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A charging control circuit of universal serial bus (USB) device, wherein the USB device is coupled to an external charger and a battery device, the USB device comprises a core circuit having a first pin and a second pin, and the charging control circuit comprises:

a voltage source, arranged for selectively coupling to one of the first pin and the second pin according to a switch control signal;

wherein input impedance looking into the core circuit from the first pin and the second pin is configured to make the voltage source substantially intact when the voltage source is coupled to at least one of the first pin and the second pin;

wherein when the external charger provides a first supply voltage to charge the battery device to make the battery device generate a battery output voltage, the charging control circuit is arranged to be powered up by the first supply voltage, and the switch control signal is generated in response to a second supply voltage derived from the battery output voltage.

2. The charging control circuit of claim 1, wherein when the USB device is under a dead battery condition, the second supply voltage is used to power up the core circuit.

3. The charging control circuit of claim 1, wherein the switch control signal is generated from the core circuit.

4. The charging control circuit of claim 1, further comprising:
a current source, arranged for selectively coupling to one of the first pin and the second pin according to the switch control signal.

5. The charging control circuit of claim 1, further comprising:
a charger controller, arranged for generating a control signal;
a charger detector, arranged for providing the voltage source; and
a switch circuit, coupled to the first pin and the second pin in parallel, the switch circuit arranged for selectively coupling the voltage source to one of the first pin and the second pin according to the switch control signal.

6. The charging control circuit of claim 5, wherein the control signal is generated in response to the first supply voltage.

7. A charging control circuit of universal serial bus (USB) device, wherein the USB device is coupled to an external charger and a battery device, the USB device comprises a core circuit having a first pin and a second pin, and the charging control circuit comprises:
a current source, arranged for selectively coupling to one of the first pin and the second pin according to a switch control signal;
wherein input impedance looking into the core circuit from the first pin and the second pin is configured to make the current source substantially intact when the current source is coupled to at least one of the first pin and the second pin;
wherein when the external charger provides a first supply voltage to charge the battery device to make the battery device generate a battery output voltage, the charging control circuit is arranged to be powered up by the first supply voltage, and the switch control signal is generated in response to a second supply voltage derived from the battery output voltage.

8. The charging control circuit of claim 7, wherein when the USB device is under a dead battery condition, the second supply voltage is used to power up the core circuit.

9. The charging control circuit of claim 7, wherein the switch control signal is generated from the core circuit.

10. A core circuit of universal serial bus (USB) device, wherein the USB device is coupled to an external charger and a battery device, and the core circuit comprises:
a first pin and a second pin coupled to the external charger;
wherein input impedance looking into the core circuit from the first pin and the second pin is configured to make a voltage source substantially intact when the voltage source is coupled to at least one of the first pin and the second pin;
wherein when the external charger provides a first supply voltage to charge the battery device to make the battery device generate a battery output voltage, the core circuit is arranged to be powered up by a second supply voltage derived from the battery output voltage generated by the battery device, rather than derived from the first supply voltage, and the core circuit generates a switch control signal in response to the second supply voltage to control the voltage source to selectively couple to one of the first pin and the second pin.

11. The core circuit of claim 10, wherein the core circuit generates the switch control signal to further control a current source to selectively couple to one of the first pin and the second pin.

12. The core circuit of claim 10, further comprising:
a first P-type transistor, having an output node coupled to the first pin; and
a second P-type transistor, having an output node coupled to the second pin;
wherein a control node of the first P-type transistor and a control node of the second P-type transistor are tied to the second supply voltage.

13. The core circuit of claim 10, further comprising:
a control circuit, arranged for receiving a core voltage and generating the switch control signal; and
a physical layer circuit, having the first pin and the second pin, the physical layer circuit arranged for being configured by the switch control signal and powered by the core voltage.

* * * * *